(12) United States Patent
Myers et al.

(10) Patent No.: US 9,053,653 B2
(45) Date of Patent: Jun. 9, 2015

(54) USING DISPLAY MONITOR USER CONTROLS TO ADJUST AN ACCESSORY

(75) Inventors: Robert L. Myers, Loveland, CO (US); Edward S. Beeman, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 615 days.

(21) Appl. No.: 13/259,492

(22) PCT Filed: Aug. 13, 2009

(86) PCT No.: PCT/US2009/053732
§ 371 (c)(1),
(2), (4) Date: Sep. 23, 2011

(87) PCT Pub. No.: WO2011/019352
PCT Pub. Date: Feb. 17, 2011

(65) Prior Publication Data
US 2012/0026398 A1    Feb. 2, 2012

(51) Int. Cl.
*G09G 5/00* (2006.01)
*G06F 3/14* (2006.01)

(52) U.S. Cl.
CPC *G09G 5/003* (2013.01); *G06F 3/14* (2013.01); *G09G 5/005* (2013.01); *G09G 5/006* (2013.01); *G09G 2320/0606* (2013.01); *G09G 2320/08* (2013.01); *G09G 2340/12* (2013.01); *G09G 2370/047* (2013.01)

(58) Field of Classification Search
CPC ......... G06F 9/4445; G06F 3/048; G06F 3/14; H04L 67/025; G09G 5/005; G09G 5/006; G09G 2320/0606; G09G 2320/08; G09G 2340/12; G09G 2370/047

USPC .......... 715/234, 243, 254, 255, 719
See application file for complete search history.

(56) References Cited

U.S. PATENT DOCUMENTS

| | | | |
|---|---|---|---|
| 2004/0255067 A1 | 12/2004 | Wolford | |
| 2005/0275641 A1* | 12/2005 | Franz | 345/204 |
| 2006/0066639 A1 | 3/2006 | Iwaki | |
| 2007/0115258 A1 | 5/2007 | Cupps et al. | |
| 2007/0206827 A1* | 9/2007 | Tupman et al. | 381/334 |
| 2008/0034389 A1 | 2/2008 | Park | |
| 2009/0284476 A1* | 11/2009 | Bull et al. | 345/173 |
| 2010/0070997 A1* | 3/2010 | Friedman | 725/37 |
| 2010/0238994 A1* | 9/2010 | Cakareski et al. | 375/240.01 |

FOREIGN PATENT DOCUMENTS

| | | | |
|---|---|---|---|
| CN | 1897678 | | 1/2007 |
| WO | WO-2008019145 | | 2/2008 |
| WO | WO 2008/091127 | * | 7/2008 |

OTHER PUBLICATIONS

International Searching Authority, International Seach Report and Written Opinion, Appln No. PCT/US2009/053732, date of mailing Apr. 30, 2010, 15 p.

* cited by examiner

*Primary Examiner* — Kyle Stork
(74) *Attorney, Agent, or Firm* — Brooks, Cameron & Huebsch, PLLC

(57) ABSTRACT

A display monitor chassis comprises user controls and a display screen. The display screen displays a first graphical user interface (GUI) that can be manipulated using at least one of the user controls to adjust the display monitor. The display screen is capable of displaying a second GUI that can be manipulated using at least one of the user controls to adjust an accessory communicably coupled to the display monitor chassis.

14 Claims, 4 Drawing Sheets

USING DISPLAY MONITOR USER CONTROLS TO ADJUST AN ACCESSORY

CROSS REFERENCE TO RELATED APPLICATION

This application claims priority under 35 U.S.C. §119 to application PCT/US2009/053732 filed Aug. 13, 2009, the contents of which is hereby incorporated by reference in it is entirety.

BACKGROUND

Video-processing accessories are often used to provide additional features or functionality to desktop monitors. For example, such a video-processing accessory (VPA) may provide support for a video interface or video signal not natively supported by the monitor itself.

Before a VPA can be used in a particular computer system, a user must install it for proper operation. Installation typically includes coupling the VPA between the monitor's video input port(s) and the source of the video data (e.g., a computer chassis). Installation also includes providing a user interface with which a user may control the VPA. Once installed, the user controls the computer monitor and the VPA separately from each other: the monitor is controlled using user controls on the monitor chassis, while the VPA is controlled by the user interface installed by the user.

BRIEF DESCRIPTION OF THE DRAWINGS

For a detailed description of exemplary embodiments of the invention, reference will now be made to the accompanying drawings in which.

NOTATION AND NOMENCLATURE

Figure 1A:
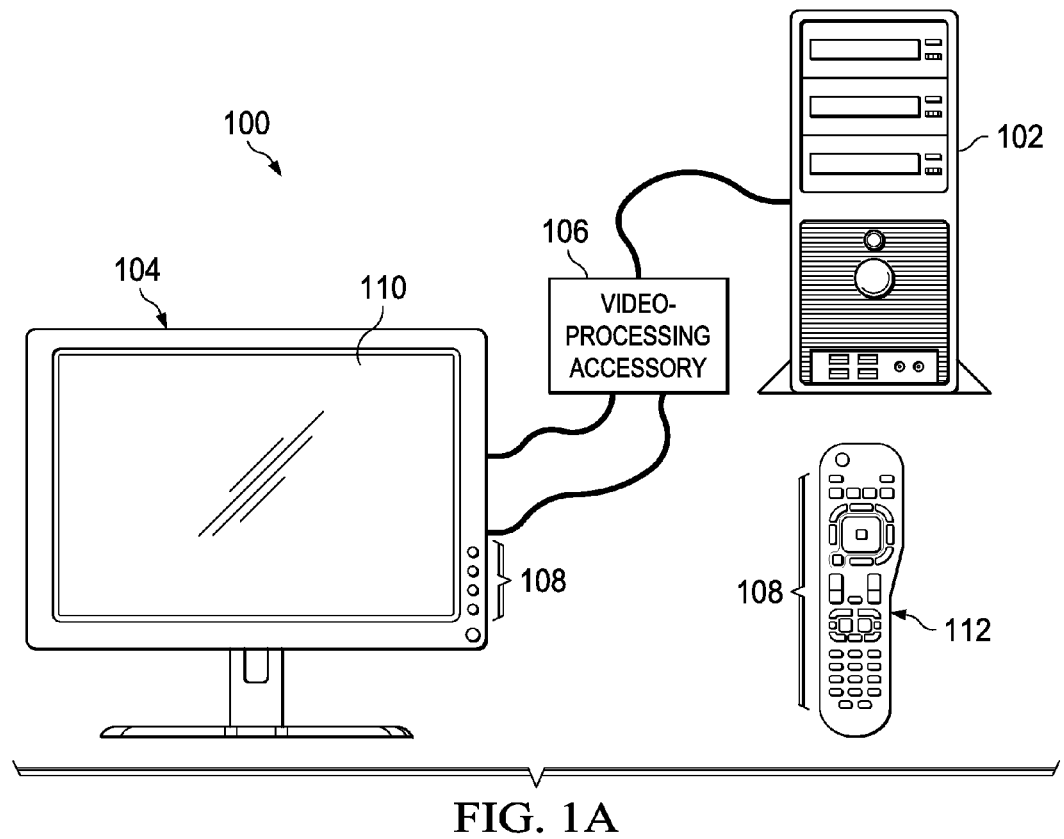
FIGS. 1A-1B show block diagrams of an illustrative system in accordance with embodiments.

Certain terms used throughout the following description and claims refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "controls" may include a single user-interactive control device or multiple user-interactive control device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein is a technique whereby both a computer monitor and a video-processing accessory (VPA) may be controlled using only the computer monitor. More specifically, the computer monitor/computer monitor chassis is communicably coupled to one or more user controls (e.g., pushbuttons) that can be used to control the monitor's settings. The user controls may be disposed directly on the monitor chassis, or the user controls may be disposed on a remote control device that communicates with the monitor. When a user control is pressed or otherwise activated, the monitor displays a graphical user interface (GUI) that enables the user to adjust the monitor's settings. The user interacts with the user controls and the GUI until the desired monitor settings are achieved.

In accordance with embodiments, the GUI also enables the user to control one or more settings associated with the VPA. Although the plural term "settings" may be used herein, such term includes a single setting or multiple settings. Signals are transferred between the monitor and the VPA as the user activates various user controls on the monitor. Thus, the user is able to interact with the user controls and the GUI on the monitor to effectuate the desired settings for the VPA. In this way, a user is able to adjust settings for both the monitor and the VPA using only the monitor' controls. Any number of VPAs may be controlled in this fashion.

A VPA, such as the VPA described herein, generally comprises a discrete device that can be coupled between a video signal source and a monitor/display. For example, video signal outputs from the rear of a computer chassis may couple to a VPA and, in turn, a video signal output of the VPA may couple to a monitor/display. The VPA typically alters the video signals in some fashion before forwarding them to the monitor/display. For example, the VPA may alter video signals output by the computer by adding or removing video data from the video signals. The term "VPA" (or, alternatively, "video processing logic") as used in the specification and claims should be broadly interpreted to mean an apparatus and/or logic that is at least similar to the VPA description provided above.

FIG. 1A shows a block diagram of an illustrative computer system 100 in accordance with various embodiments. The computer system 100 comprises a computer chassis 102 (or simply "chassis" 102), a display monitor chassis (also called a monitor, computer monitor, or display monitor) 104 (e.g., cathode-ray-tube (CRT) monitor; flat panel display, etc.) having a display screen 110, and a VPA 106. The chassis 102 houses various computer components, such as a motherboard, processor(s), memory, audio/video cards, etc. The chassis 102 comprises a video output port (shown in FIG. 1B as the output port 150) via which the chassis 102 outputs video data signals (e.g., to a computer monitor for display). The video output port may be coupled to a video card or other suitable circuit logic inside the chassis 102. The video output port couples to the VPA 106 using a wired and/or wireless connection. In this manner, the VPA 106 receives video output data that is intended for the monitor 104.

In turn, the VPA 106 couples to input video ports of the monitor 104. More specifically, the VPA 106 couples to the monitor 104 using multiple (e.g., two) wired and/or wireless connections. As described in greater detail below with respect to FIG. 2, at least one of the connections comprises a bi-directional command/control channel via which the monitor 104 and the VPA 106, for example, trade commands. At least one other of the connections comprises a uni-directional channel via which the VPA 106 transfers video signals to the monitor 104. These video signals either are the same signals that the computer chassis 102 provided to the VPA 106 or are modified versions of those signals. The monitor 104 receives the video signals from the VPA 106 and uses the video signals to generate images (graphics, text, etc.) on its display screen 110. The monitor 104 includes multiple user controls 108. As explained below, a user interacts with the user controls 108 and a GUI displayed on the monitor 104 to control the monitor 104 and/or the VPA 106. In some embodiments, the user controls 108 alternatively or additionally may be disposed on a remote control device 112 (FIG. 1) that wirelessly, or by wired connection, communicates with the monitor 104.

Figure 1B:
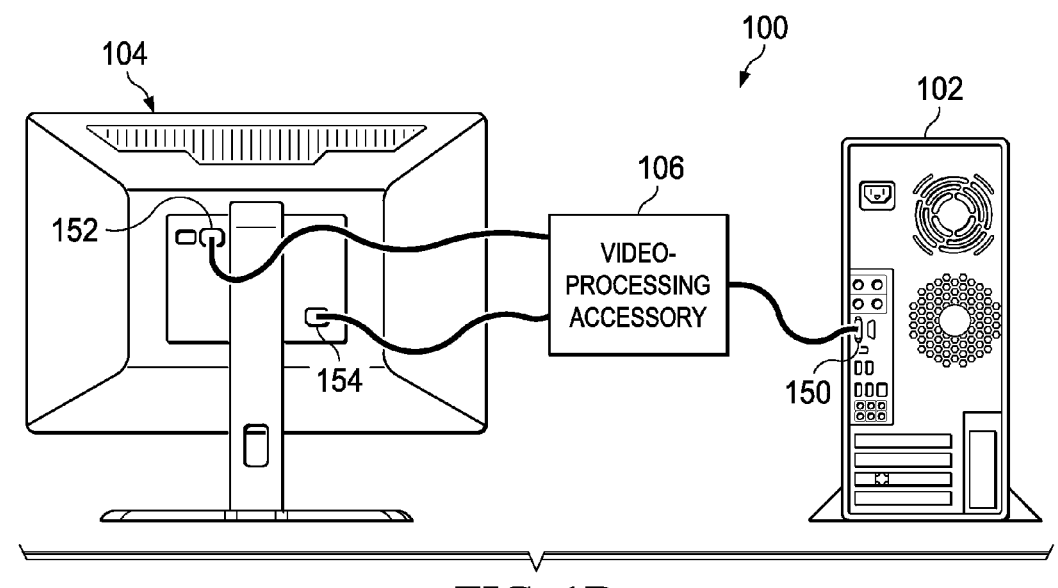

FIG. 1B shows a rear view of the chassis 102 and the monitor 104. As shown, the chassis 102 comprises a video output port 150 to which the VPA 106 couples. Further, in the example of FIG. 1B the monitor 104 comprises a video input port 152 and a command input port 154. The VPA 106 couples to each of these ports. In some embodiments, a single port may be used in lieu of the ports 152 and 154, with the signals from the VPA 106 properly distributed by circuit logic within the monitor 104.

Figure 2:
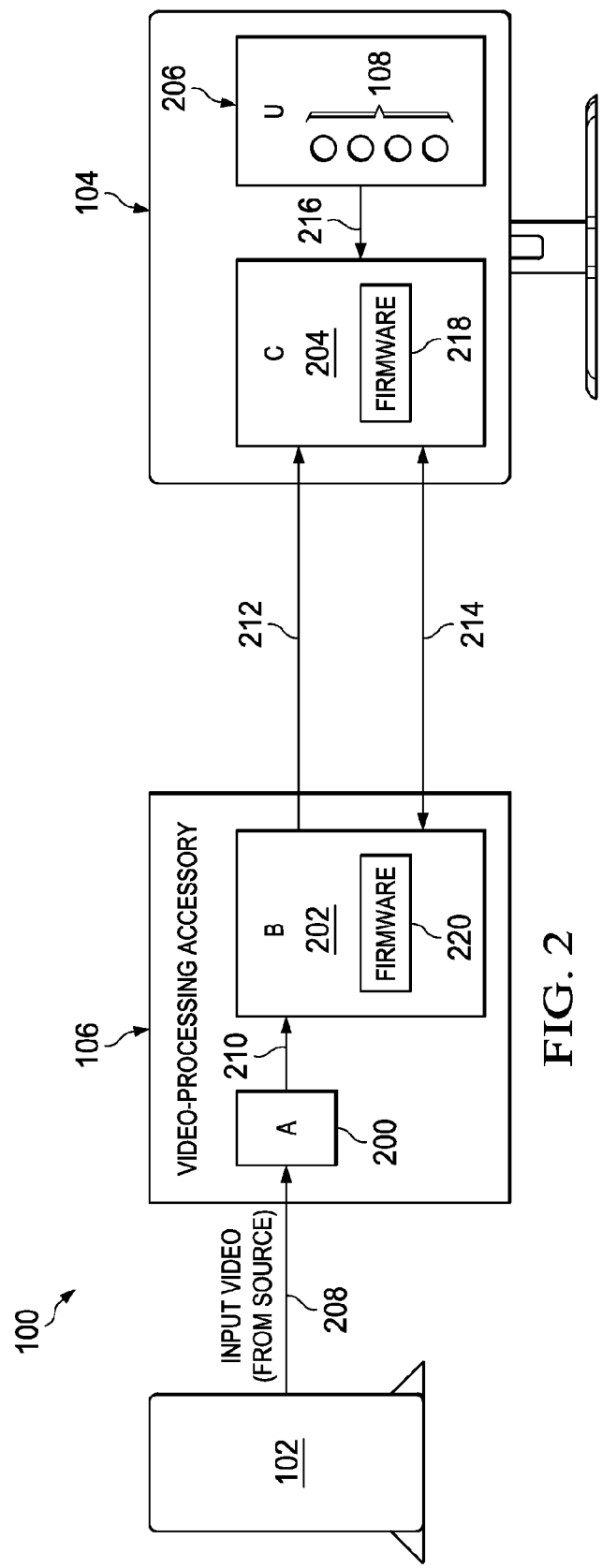
FIG. 2 shows another block diagram of the illustrative system of FIGS. 1A-1B in accordance with embodiments.

FIG. 2 shows a block diagram of the illustrative system 100 of FIG. 1 in accordance with various embodiments. As shown, the system 100 includes the computer chassis 102, the VPA 106 and the computer monitor 104. The VPA 106 comprises multiple components, including control logic 202 and video-processing logic (VPL) 200 (VPL 200 includes logic that may perform various video signal processing functions including, e.g., deinterlacing logic, interface translation logic, etc.). The control logic 202 controls the various functions of the VPA 106. The control logic 202 comprises firmware 220. The firmware 220 causes the control logic 202 to perform the actions herein attributed to the control logic 202 (i.e., by way of a processor that executes the firmware 220).

Similarly, the monitor 104 comprises control logic 204. The control logic 204 controls the various functions of the monitor 104. For example, the control logic 204 causes images to be generated on the display screen of the monitor 104 using the received video data; receives and processes user input from user controls 108 (described below); and interacts with the VPA 106 in accordance with embodiments described herein. The control logic 204 comprises firmware 218. The firmware 218 causes the control logic 204 to perform the actions herein attributed to the control logic 204 (i.e., by way of a processor that executes the firmware 218).

The monitor 104 also comprises user controls 108 disposed at least partially in, on, or about the monitor 104 (e.g., a panel 206), the remote control 112, or any combination thereof. Although four user controls are shown in FIG. 2, any number of user controls may be used. Further, although the user controls have been described herein as pushbuttons, devices other than pushbuttons may be used. For instance, any device or combination of devices that is usable to control the settings of the monitor 104 may be substituted for the user controls/pushbuttons 108. Thus, the use of the term "user control(s)" in the specification and the claims should be broadly interpreted to include any apparatus that could perform a function similar to a pushbutton, or any other type of user-interactive apparatus (e.g., a rotary device).

The computer chassis 102 couples to the VPL 200 via a wired or wireless connection 208. In turn, the VPL 200 couples to the control logic 202 via a wired or wireless connection 210. Further, the VPA control logic 202 couples to the monitor control logic 204 via a wired or wireless video signal connection 212 and via a wired or wireless bi-directional command/control connection 214. The panel 206 comprising the user controls 108 couples to the control logic 204 via a wired or wireless connection 216.

Figure 3A:
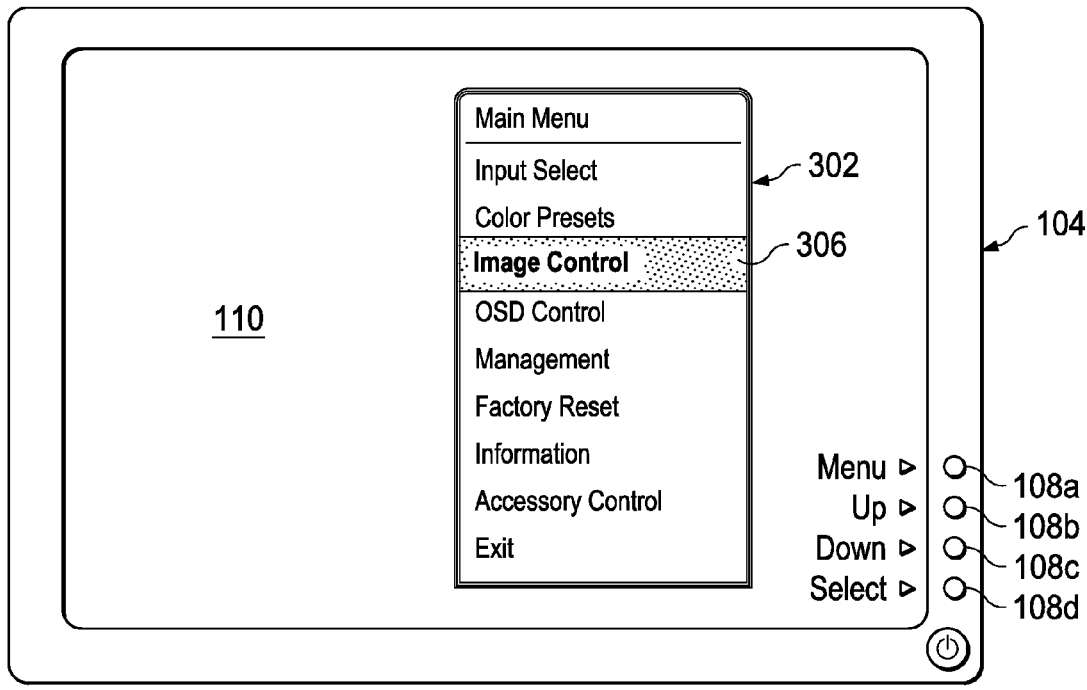
FIGS. 3A-3B show illustrative graphical user interfaces in accordance with embodiments.

Referring now to FIG. 3A, pressing an appropriate user control 108 (e.g., in some embodiments, user control 108a or, in other embodiments, any of the user controls 108) on the monitor 104 causes the GUI 302 to appear on the display screen 110 of the monitor, as shown. The GUI 302 (and other image(s)) appears on the display screen 110 because the pushing of a user control 108 is detected by hardware within the monitor and appropriate signals are relayed to the control logic 204. In turn, the control logic 204 and its firmware 218 use the signals to determine what images should be displayed by the control logic 204.

The GUI 302 comprises a menu of options from which the user may select to adjust the settings of the monitor 104. As shown, various options may be presented (e.g., Input Select, Color Presets, Image Control, OSD Control, Management, Factory Reset, Information, Accessory Control and Exit). The scope of this disclosure is not limited to the specific options shown in FIG. 3A. The GUI 302 also may include text that is aligned with the user controls 108 to indicate the function of each of the user controls. As shown in FIG. 3A, for example, user control 108a causes the menu to appear; user control 108b causes the highlight bar 306 to move up the list of options in the menu; user control 108c causes the highlight bar 306 to move down the list of options in the menu; and user control 108d causes the option currently highlighted by the highlight bar 306 to be selected. Thus, for example, although the highlight bar 306 currently rests on the "Image Control" option, a user may select the "Color Presets" option by pressing user control 108b once to move the highlight bar 306 to "Color Presets," and then by pressing user control 108d to select "Color Presets."

The connection 214, when made to both the VPA 106 and the monitor 104, enables the VPA 106 to automatically detect the monitor's presence and enables the monitor 104 to automatically detect the VPA's presence. Various connection interfaces may be used for connection 214 (e.g., Display Data Channel (DDC) connection provided by the Digital Visual Interface (DVI) or High-Definition Multimedia Interface (HDMI) standard interfaces). If the GUI 302 is invoked while the monitor 104 and VPA 106 are not coupled to each other, the "Accessory Control" option is "grayed out" (i.e., appears in a different font or different font color than do the other options) to indicate that the VPA 106 cannot be controlled using the user controls 108. However, when the monitor 104 and the VPA 106 are properly coupled to each other, the monitor 104 detects the VPA 106's presence and causes the Accessory Control option on the GUI 302 to appear in the same font and same color as the other options. Displaying the Accessory Control option in this way indicates to the user that the Accessory Control option is available for selection and that the VPA 106 can be controlled using the user controls 108.

Figure 3B:
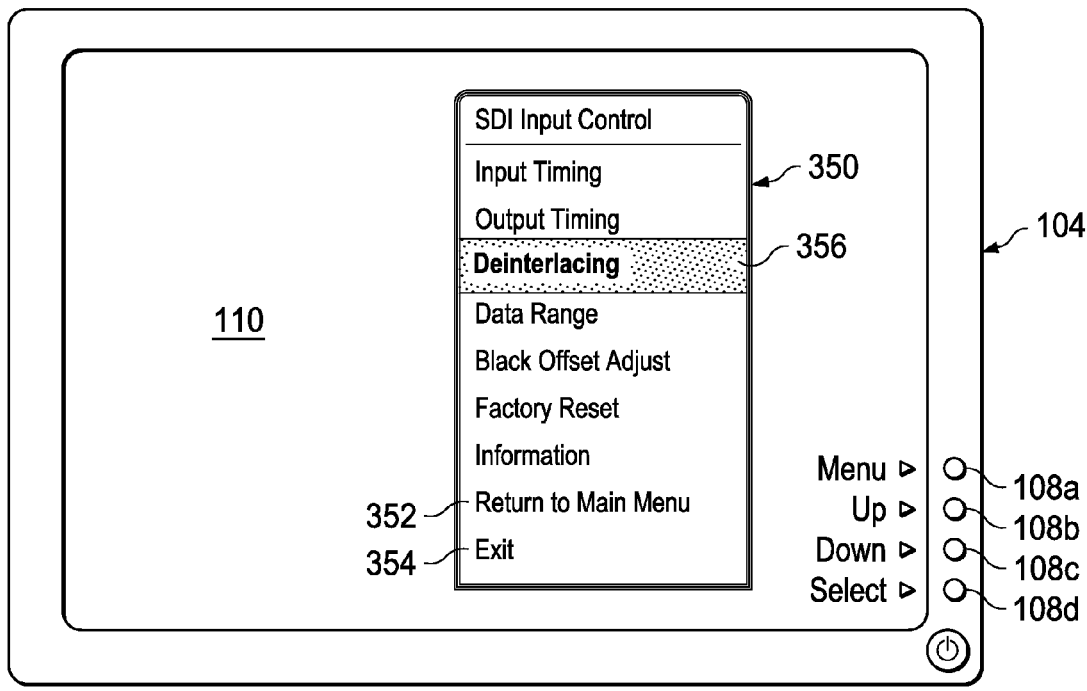

Referring to FIG. 3B, assuming that the VPA 106 and monitor 104 are coupled to each other, and further assuming that a user uses the user controls 108 to select the Accessory Control option, a GUI 350 is displayed on the monitor 104. The GUI 350 is a sub-menu of the main menu shown in FIG. 3A. The GUI 350 presents various options that are usable to adjust the VPA 106. Referring to FIGS. 2 and 3A, video data for the GUI 350 is generated by the control logic 202 of the VPA 106 and is added to the video signal provided via connections 208 and 210 to produce a modified video signal. The modified video signal is then output on the connection 212 to the control logic 204 of the monitor 104. The addition occurs when the user selects the Accessory Control option. Selection of the Accessory Control option indicates to the control logic 204 that the control logic 204 should cease displaying the monitor 104's GUI 302 and should instead display the modified video signal received from the control logic 202, which already contains data for the VPA's GUI 350.

In at least some embodiments, the control logic 202 generates the GUI 350 to have a look and feel similar to that of the GUI 302. The control logic 202 achieves this similarity by reading GUI design parameters (e.g., current location of GUI 302 on the screen; GUI 302 size, color, shape, etc.) from the control logic 204 via connection 214. The control logic 202 may read this information upon being prompted to do so by the control logic 204 when the Accessory Control option is selected on the GUI 302. Alternatively, in some embodiments, when the Accessory Control option is selected on the GUI 302, the control logic 204 may deactivate its own GUI 302 and may transmit its GUI design parameters to the control logic 202. The control logic 202, upon receiving the design parameters, may "understand" that the Accessory Control option has been selected and that it should overlay data for its GUI 350 onto the video signal, as explained above.

As shown, the options on GUI 350 may include Input Timing, Output Timing, Deinterlacing, Data Range, Black Offset Adjust, Factory Reset, Information, Return to Main Menu and Exit. The scope of this disclosure is not limited to the options shown in FIG. 3B. The GUI 350 is displayed to the user until the user selects the Return to the Main Menu option, the Exit option, or until a certain amount of time elapses since the user last pressed a user control 108. If the user selects the Return to the Main Menu option, the control logic 204 sends a signal to the control logic 202 commanding the control logic 202 to stop overlaying the video signal with its GUI 350. Further, the control logic 204 begins displaying its own GUI 302 on the monitor 104. Thus, the GUI 350 disappears, while the GUI 302 reappears. If, instead, the user selects the Exit option, or if a time-out occurs because the user has not pressed a user control 108 for a predetermined length of time (e.g., 10 seconds), the control logic 204 sends a signal to the control logic 202 commanding the control logic 202 to stop overlaying the video signal with data for its GUI 350. However, unlike with the Return to the Main Menu option, the control logic 204 does not display its own GUI 302. Thus, no GUI is shown.

However, until one of the foregoing actions occurs, the GUI 350 continues to be displayed to the user, and any input entered by the user via the user controls 108 is routed to the control logic 202. When one of the foregoing actions does occur, the GUI 350 is no longer displayed to the user, and any input entered by the user via the user controls 108 is routed to the control logic 204 and not to the control logic 202.

Figure 4:
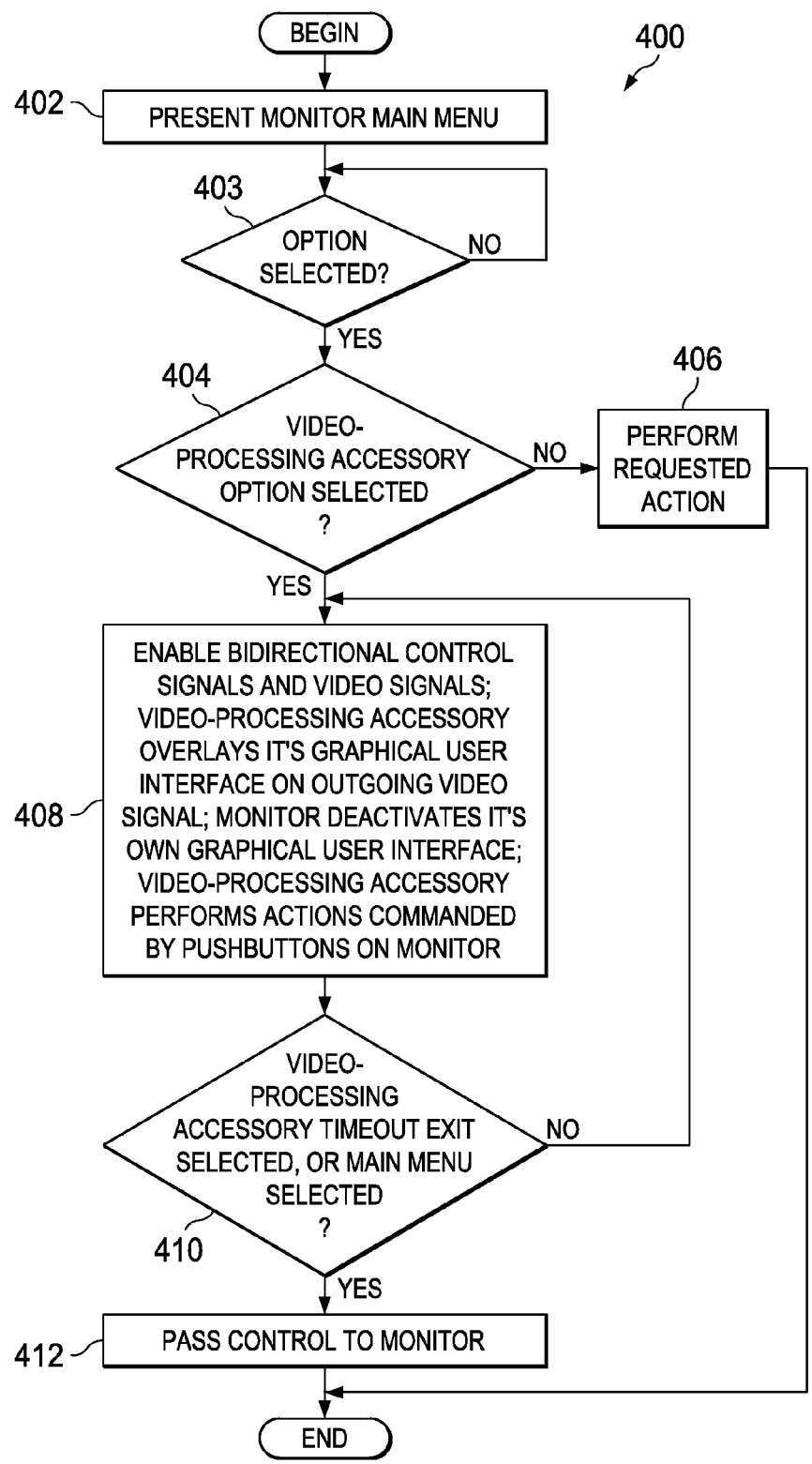
FIG. 4 shows a flow diagram of an illustrative method in accordance with embodiments.

FIG. 4 shows a flow diagram of an illustrative method 400 in accordance with various embodiments. The method 400 begins by presenting the monitor's main menu (e.g., the GUI 302 shown in FIG. 3A) (block 402). The method 400 continues by determining whether the user has selected an option using a user control (block 403). If not, control of the method returns to block 403. Otherwise, the method 400 comprises determining whether the VPA option (e.g., the Accessory Control option in FIG. 3A) has been selected (block 404). If not, then the action or option that was selected is performed (block 406). However, if the VPA option is selected, the method 400 comprises enabling bi-directional control signals to pass between the monitor and the VPA, as well as the VPA overlaying its own GUI onto the video signal provided to the monitor and the monitor deactivating its own GUI (block 408). The VPA performs as it is commanded to perform by the user using the user controls on the monitor (block 408). The method 400 further comprises determining whether a VPA timeout has occurred, whether the user has selected the Exit option, or whether the user has selected the Main Menu option (block 410). If not, control of the method 400 returns to block 408. However, if one of the possibilities in block 410 has occurred, the method 400 comprises passing control from the VPA to the monitor (block 412). The steps of the method 400 may be adjusted, added to, and/or deleted from, as desired.

Although the monitor 104 is described herein as a computer monitor, in at least some embodiments, other types of monitors/displays may be used (e.g., a "monitor" may be a television screen or other display apparatus). Further, although the figures described herein show only one VPA coupled between the video source and the monitor, in some embodiments, multiple VPAs may be serially coupled. Thus, for instance, referring to FIG. 2, an additional VPA may be coupled between the computer chassis 102 and the VPA 106. The monitor 104 would interact with the VPA 106 as described above, and the monitor 104 would interact with the additional VPA by way of the control logic 202 housed within the VPA 106 (e.g., the control logic 202 would relay signals between the additional VPA and the monitor 104).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A display monitor chassis, comprising:
    user controls on the display monitor chassis; and
    a display screen, the display screen displays a first graphical user interface (GUI), the first GUI comprising a menu of options, that is to be manipulated using at least one of said user controls to adjust the display monitor; and
    control logic coupled to the display screen;
    wherein said display screen is to display a second GUI, the second GUI comprising a menu of options, that can be manipulated using at least one of the user controls to adjust an accessory communicably coupled to the display monitor chassis; and
    wherein the first GUI menu of options includes an option to control the accessory, the option is to be visually indicated as being user-selectable based on the control logic detecting that the accessory is connected to the display monitor chassis, but to be visually indicated as not being user-selectable based on the control logic not detecting that the accessory as being connected to the display monitor chassis.

2. The display monitor chassis according to claim 1, wherein, in response to a command received from one of the user controls, a display monitor of the display monitor chassis displays the second GUI in lieu of the first GUI, and wherein, while said second GUI is displayed, the display monitor routes input signals from the user controls to the accessory.

3. The display monitor chassis according to claim 2, wherein the display monitor ceases displaying the second GUI when an event occurs, the event selected from the group consisting of a timeout event, user selection of an exit option on the second GUI, and user selection of a first GUI option on the second GUI.

4. The display monitor chassis according to claim 1, wherein said user controls comprise pushbuttons disposed on said chassis.

5. A video processing accessory connectable between a computer and a display monitor, comprising:
   video-processing logic that modifies a video signal receivable from the computer to produce a modified video signal to be provided to the display monitor; and
   control logic including a hardware processor, the control logic coupled to the video-processing logic;
   wherein, when prompted by the display monitor, the control logic adds video data associated with a graphical user interface (GUI) to the modified video signal, the GUI comprising a menu of options; and
   wherein the control logic receives a command from the display monitor in response to display of the GUI and adjusts the system in accordance with said command.

6. The video processing accessory according to claim 5, wherein said control logic is to receive a signal from the display monitor prompting the control logic to add said video data to the modified video signal as a result of a user activating at least one user control coupled to the monitor.

7. The video processing accessory according to claim 5, wherein said control logic is to receive a signal from the display monitor prompting the control logic to add said video data to the modified video signal as a result of a user activating a user control on a remote control communicably coupled to the display monitor.

8. The video processing accessory according to claim 5, wherein the control logic generates said video data using design parameters obtained from the display monitor.

9. A method, comprising:
   a monitor displaying a first graphical user interface (GUI), the first GUI including a menu of options;
   as a result of an accessory option being selected from the first GUI using apparatuses on the monitor, the monitor enabling bi-directional communication between the monitor and an accessory external to the monitor, and the accessory modifying a video signal received from a computer with video data associated with a second GUI, the second GUI including a menu of options, to produce a modified video signal;
   providing, by the accessory, the modified video signal to the monitor; and
   the monitor displaying said second GUI in lieu of the first GUI.

10. The method according to claim 9, further comprising the monitor receiving user input via at least one of said apparatuses and providing said user input to the accessory, said accessory adjusts itself in accordance with said user input.

11. The method according to claim 9, further comprising the monitor receiving user input via at least one of said apparatuses and providing said user input to the accessory, said accessory adjusts said second GUI in accordance with said user input and the monitor displays the adjusted second GUI.

12. The method according to claim 9, further comprising ceasing to display the second GUI if an event occurs, said event selected from the group consisting of a timeout event, user selection of an exit option on the second GUI, and user selection of a first GUI option on the second GUI.

13. The method according to claim 12, wherein, as a result of said event occurring, the monitor ceasing to route user input signals from the monitor to the accessory.

14. The method according to claim 9 further comprising:
   detecting, by the monitor, whether the accessory is connected to the monitor;
   if the accessory is determined to be connected to the monitor, generating a GUI to include a menu with an option to control the accessory, the option being visually indicated on the GUI as being user-selectable; and
   if the accessory is determined not to be connected to the monitor, generating the GUI to include the menu with the option as being visually indicated as not being user-selectable.

* * * * *